Oct. 20, 1925.
H. LUBÉ
1,557,597
MOTION PICTURE MACHINE
Filed Sept. 21, 1922     3 Sheets-Sheet 1
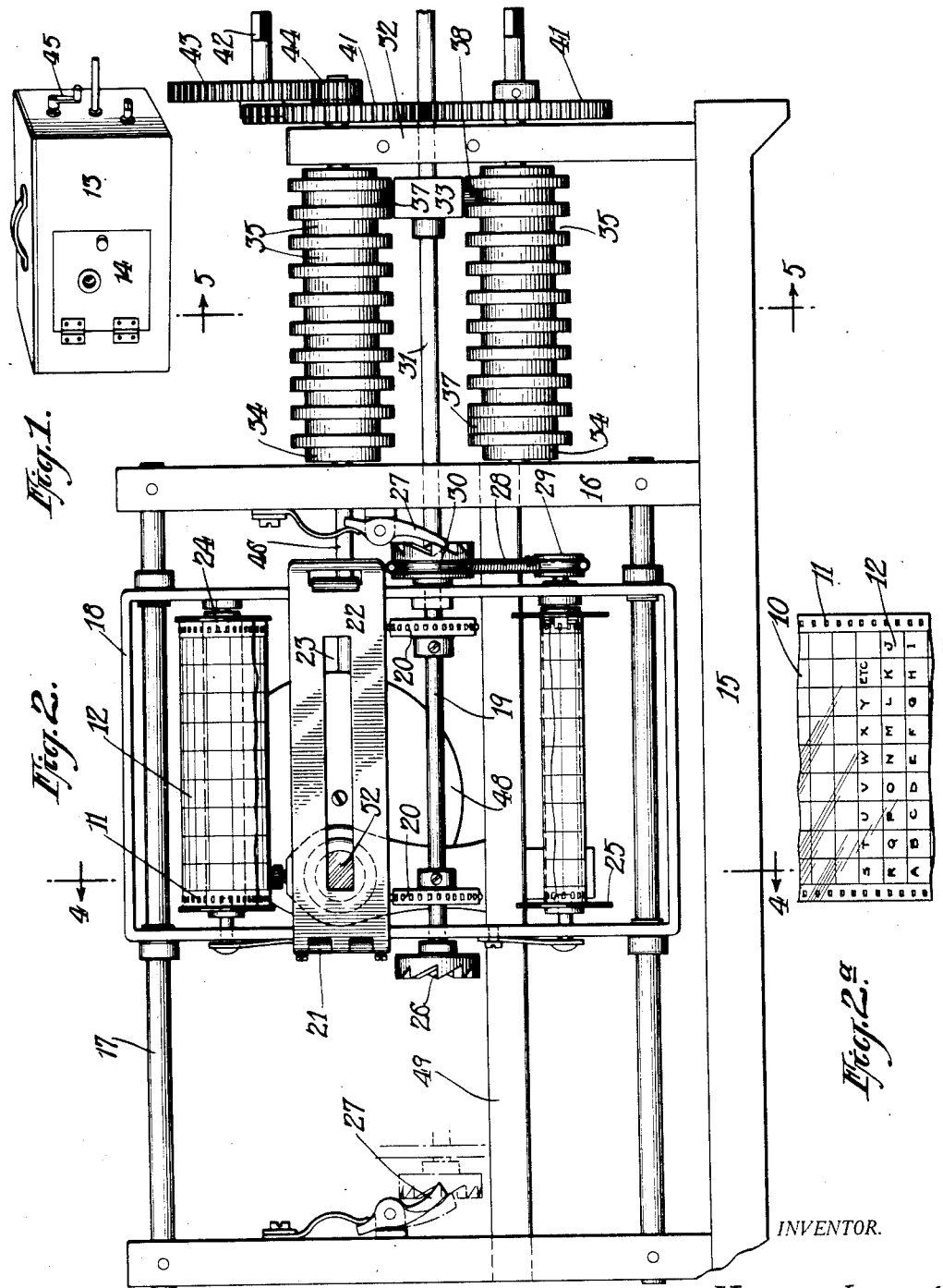
INVENTOR.
BY HENRY LUBÉ
ATTORNEY.

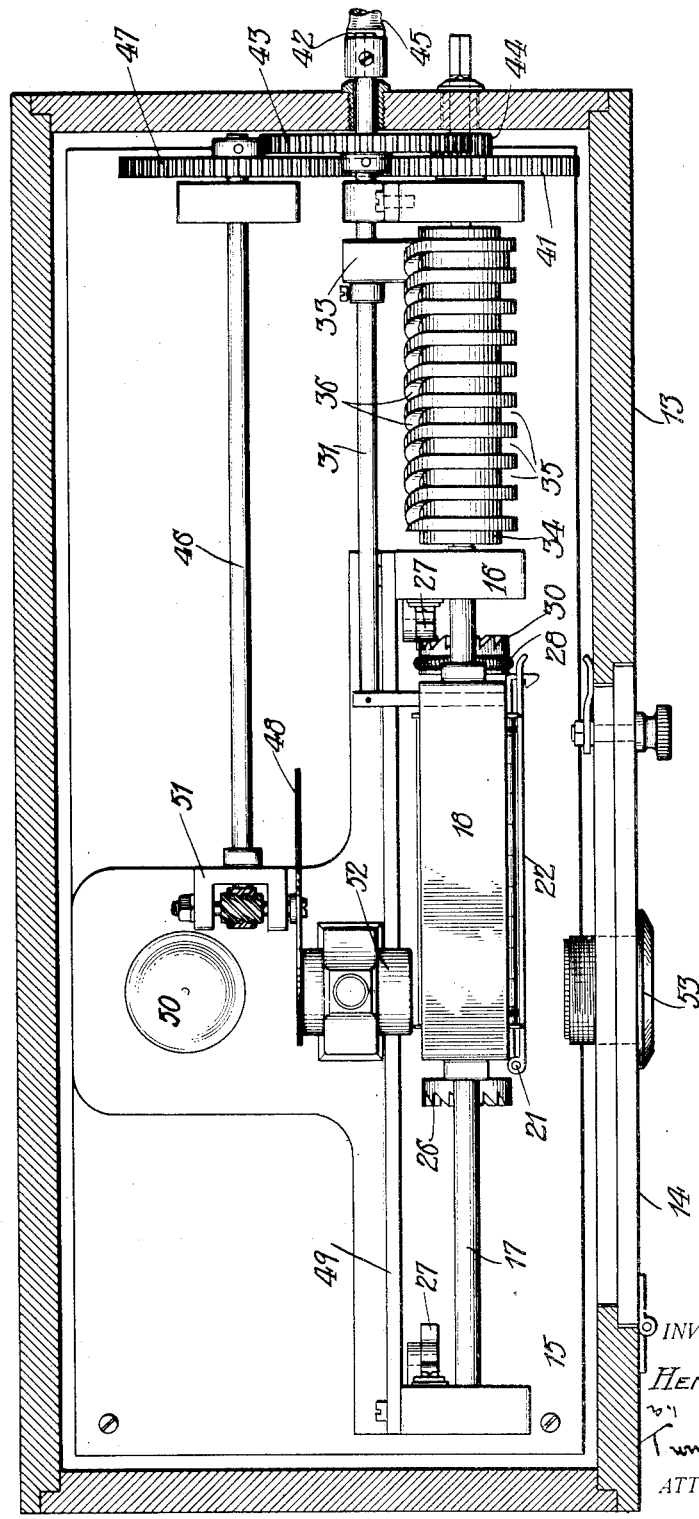

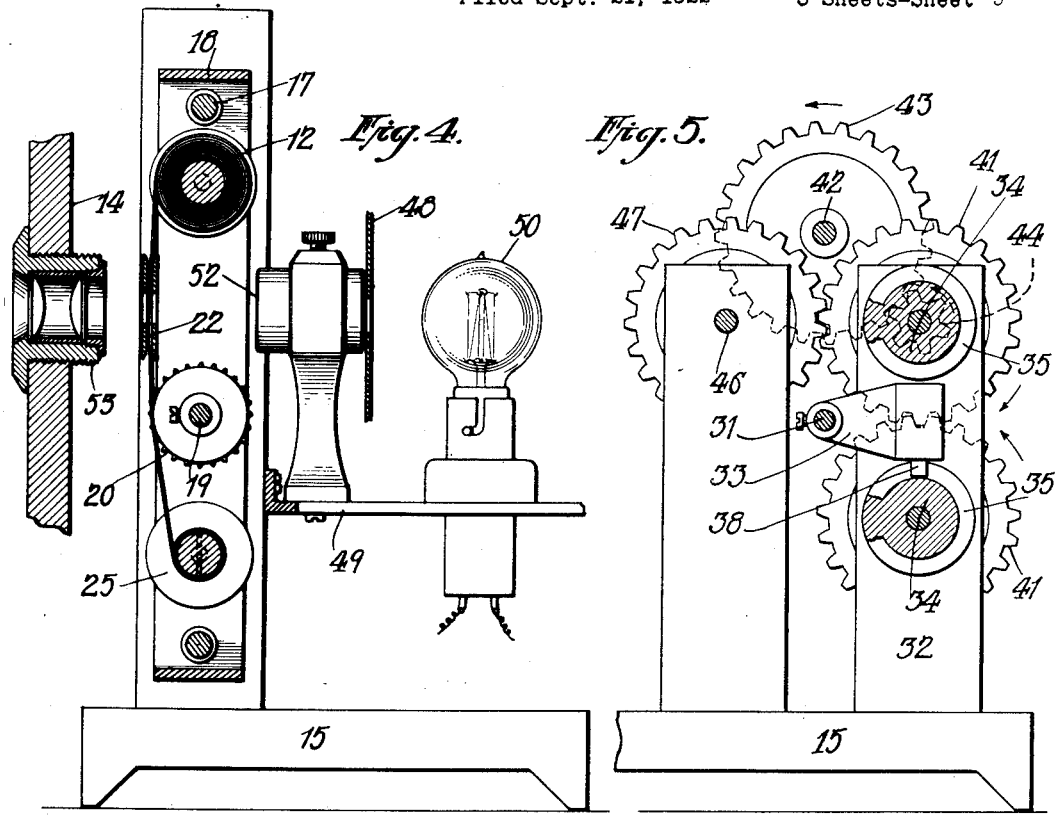
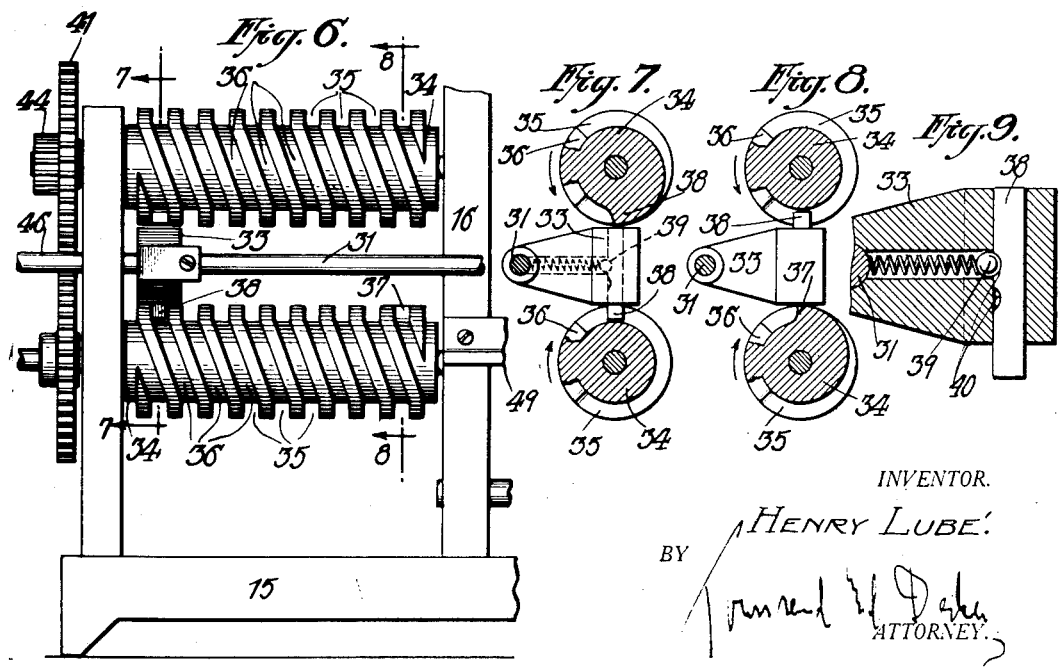

Patented Oct. 20, 1925.

1,557,597

UNITED STATES PATENT OFFICE.

HENRY LUBÉ, OF COLLEGE POINT, NEW YORK, ASSIGNOR TO RADIO MOTION PICTURE PHON. CORP., OF LONG ISLAND CITY, NEW YORK, A CORPORATION OF MASSACHUSETTS.

MOTION-PICTURE MACHINE.

Application filed September 21, 1922. Serial No. 589,520.

*To all whom it may concern:*

Be it known that I, HENRY LUBÉ, a citizen of the United States, and a resident of College Point, in the county of Queens and State of New York, have invented certain new and useful Improvements in Motion-Picture Machines, of which the following is a specification.

My invention relates to a motion picture machine and aims to provide a device of this nature which is equally adaptable for the taking of pictures, as well as the projection of the same.

It is a well appreciated fact that numerous motion picture machines have been used for both the taking and projecting of pictures, but these devices have offered certain objections in some instances, particularly where the same were constructed for use by amateurs in that first objections are to be attributed to the fact that it has been necessary to utilize a strip of film passed from a feeding reel to a receiving reel, and incident to the fact that the exposures are made successively one above the other on the strip aforementioned, it has been necessary to utilize a relatively great amount of film if an exposure of even ordinary length was to be made. Thus it has been essential that the reels be all of a size consistent with the amount of film employed, and this has necessitated a relatively bulky construction, which rendered the device impractical for use by amateurs.

Also in machines of this nature, it has been necessary to employ a mechanism for intermittently feeding the film, which mechanism, to an inexperienced person is of a relatively complicated construction, and which, aside from the difficulty in properly applying a film to the same has also involved objections in its successful operation by such a person.

Also due to the relatively great length of film employed, a quite perceptible feeding strain is exerted upon the latter from its movement from the carrying reel to the receiving reel, which strain frequently results in a breakage of the film, and also involves other well known difficulties.

With these and numerous other objections in mind, my invention has reference to a motion picture apparatus particularly adapted for projecting purposes, although readily capable of use as a camera, which apparatus will involve the use of a mechanism of extremely simple construction, the operation of which will readily be understandable to a novice, aside from the fact that this mechanism, due to its simplicity will insure against its parts becoming disarranged or being rendered otherwise inoperative.

A further object of my invention is that of providing a device of the character stated which will operate in such a manner as to permit of the employment of a novel type of film serving to materially reduce the length of the latter, and to accordingly permit of the reduction in size of the feeding and receiving reels.

Thus due to the shortening of the film the difficulties heretofore encountered in connection with the use of this element are overcome, as is also the expense incident to this factor, and due to the simplicity of construction involved in the apparatus, a commercially practical article is capable of being produced at a nominal figure.

Another object of this invention is that of providing a motion picture apparatus the parts of which will be so positive in operation as to permit of the use of the machine in a practically unattended manner, as the parts will continue to function and will need no further adjustment when once set in operation.

With these and further objects in mind my invention includes essentially a motion picture apparatus which may be embraced in a casing of relatively small size, and which will include a mechanism serving to project a novel type of film in an extremely efficient and advantageous manner.

Reference is had to the attached sheets of drawings as illustrating one practical embodiment of this invention, and it will be seen in these views that;

Fig. 1 is a perspective view of a complete motion picture machine embodying my improved construction.

Fig. 2 is a front elevation of the same with the casing removed and showing the mechanism of the machine.

Fig. 2ª is a fragmentary face view of a section of the film employed in conjunction with the machine.

Fig. 3 is a sectional plan view of the device as shown in Fig. 1.

Fig. 4 is a sectional side view taken along the line 4—4 and in the direction of the arrows indicated in Fig. 2.

Fig. 5 is a sectional end view of the operating mechanism of the machine, and taken along the line 5—5 and in the direction of the arrows indicated also in Fig. 2.

Fig. 6 is a fragmentary rear view of one end of the device as shown in Fig. 2.

Figs. 7 and 8 are sectional views taken along the lines 7—7 and 8—8 respectively, and in the direction of the arrows indicated in Fig. 6 and Fig. 9 is a fragmentary enlarged sectional side view of one portion of the operating mechanism.

The essence of my invention consists in the provision of a motion picture machine in conjunction with which a film is employed, this film carrying a series of individual exposures arranged successively side-by-side across the body of the film, together with a mechanism which will suitably feed the film to successively bring these portions of the same into register with the exposure mechanism.

In the embodiment illustrated I have shown the machine as adapted for projecting purposes, and reference being had to Fig. 2ª, which shows a face view of the film it will be seen that the latter includes a relatively broad body 10 of any desirable material, which body is provided adjacent its edges with a series of perforations 11, a series of light pictures 12 being presented by the film body 10, the successive pictures or images being identified by the letters of the alphabet. The succession of pictures being thus forward and backward across the film it will be noted, that in order to secure a proper projection the film must be fed, in the embodiment illustrated from left to right throughout a complete row of pictures, and upon reaching the end of this row it is only necessary to shift the film one step with respect to the projecting medium, so as to bring the first picture of the succeeding row into register with this mechanism, subsequent to which the film is again moved from right to left with respect to the same, sidewise throughout the entire next row, at the end of which the one step shifting is again effected, to present the left hand picture of the next row, the foregoing operations being repeated throughout the entire length of the film. Thus it will be understood that in comparison to the present length of film usually necessary to effect an exposure of a given length, it will only be necessary according to my invention to employ a film of a length which is but a fraction of the length of the film aforementioned, and according to the illustration in the drawings, in which nine exposures are presented in each row, the type of film proposed by my invention would only be one ninth the length of that of an ordinary film necessary to provide a given length of exposure. Thus due to the fact that the width of the film is not a detrimental factor, it will be understood that a great saving in space is effected, rendering the apparatus less bulky and complicated, aside from the fact that the saving of material accomplished is also a desirable asset to the invention.

Now referring to the mechanism which serves to project the successive light images appearing upon the face of the film, it will be noted, that the reference numeral 13 indicates a casing of any desirable character, which houses the projecting mechanism, it being noted, however, that a panel 14 may form a part of the casing 13 so that access may be had into the interior of the same. Positioned within this casing is a base 15 supporting a pair of similar standards one of which is marked 16, and extending between these standards is a pair of rails in the nature of bars one of which is marked 17 which slidably mount a carriage including a frame 18.

The carriage preferably embraces end and side members spaced from each other to provide in aggregate, a rectangular member, and between the side members there is rotatably mounted a shaft 19, to which is attached feed sprockets 20. This shaft is positioned approximately midway of the end members of the carriage 18, and mounted adjacent the same, and secured to the carriage preferably by a hinge 21, is a film-guiding plate 22 formed with an exposure slit 23, and the film is disposed upon a feed reel 24 supported by the carriage 18 and passes to the rear of the plate 22 subsequent to which its feed perforations 11 are engaged by the sprockets 20, its body being finally disposed upon the receiving reel 25.

Thus it will be understood, assuming that rotation is imparted to the shaft 19, and the receiving reel 25, that the film will be fed from the reel 24 past the slit 23 of the guide plate 22 and so on to the receiving reel 25, and with a view of accomplishing this rotation of the shaft and reel aforementioned, it will be seen that I may extend the shaft 19 beyond the side members of the carriage 18, and attach to the same ratchets one of which is marked 26. The teeth of these ratchets are adapted to be engaged by spring pressed pawls 27 secured one to each of the standards 16, and arranged in and at the limit of the path of axial travel of the ratchets. Thus upon the carriage 18 being moved along these tracks and reaching a point adjacent one of the standards, the outermost ratchet will be engaged by the pawl which will cause the ratchet to be rotated, and accordingly impart rotation to the shaft 19, and if the carriage is now moved in a reverse direction the second ratchet which will now become the outermost one, will finally be engaged with the second pawl provided for this purpose, to again shift the shaft 19. This shifting in each instance is sufficient to cause the sprockets 20 to feed the film the width of one row of exposures, so that upon the carriage reaching either of its limits of travel the row of light pictures appearing within the slit 23 of the guide plate 22 will be shifted to bring the next succeeding row into registry with this slit, and the movement of the shaft 19 will be imparted to the receiving reel 25 by the movement of any suitable means such as a spring belt 28 which passes around a pulley 29 attached to the receiving reel shaft, and a second pulley 30 which may form a part of one of the ratchets 26, it being noted that I prefer to employ a connection of this nature so as to compensate for the varying size of the film upon the receiving reel, and to avoid complication in this connection.

In order to shift the carriage so as to cause a co-operation of the pawls with the ratchets in the manner aforementioned, and also to successively expose each individual light image in each row, I employ a bar 31 which has one of its ends attached to the carriage, its opposite end being slidably supported by a standard 32. Attached to the bar is a traveler including a block of material 33, and rotatably mounted between one of the standards 16 and the shaft 32 I position a pair of drums 34 spaced from each other. These drums are each of a length corresponding to the width of the exposed portion of the film body 10, and an annular groove is cut in the outer face of each drum, and has the greater portion of its body disposed at right angles to the longitudinal axis of the drum to cause a dwell in the movement of the film opposite the light opening, as has been indicated at 35. However a certain portion of the groove (approximately ¼ of each convolution of the same) is angularly disposed with respect to the major portion of the groove as has been indicated by the reference numeral 36 in Figs. 3 and 6 to cause a shift of the film sidewise, it being further noted that for a purpose hereinafter described the groove of each of the drums 34 has its base raised adjacent its outer end so as to provide a cam portion 37.

The traveler 33 as in Fig. 9 slidably mounts a pin 38 which is held in one of two extreme positions by any suitable means such as for example a spring pressed ball 39 co-operating with either of two recesses 40 formed in the said pin, and the space between the drums 34 is sufficient to accommodate the traveler 33 and one end of the pin 38 carried thereby extends into the groove of one of its drums. Thus upon the drums being rotated it will be understood that the traveler 33 will move the bar 31 due to the engagement of the pin with the side walls of the groove, and more particularly the offset portions 36 of the same. This continued movement will finally result in the pin reaching the cam portion 37 of that groove within which it is riding, and upon this occurring it will be understood as in Fig. 7 that this cam will act to shift the pin to its second extreme position resulting in the pin being projected into the groove of the opposite drum. Assuming that the latter is rotating in a direction opposed to the direction of rotation of the first drum it will be appreciated that the traveler will now be moved in an opposite direction until it reaches a point adjacent the cam surface 37 of the last named drum at which point the pin 38 will again be shifted to engage the groove of the first named drum, this operation being repeated indefinitely.

Thus this functioning of the parts will cause the carriage to be shifted so as to bring each exposure of an individual row of the pictures into register with a fixed point in line with the slit 23, and due to the fact that the grooves 35 of each drum are of sufficient length to properly move the carriage 18 it will be obvious that simultaneously with the shifting of the pin 38, aforedescribed, one of the pawls 27 will be engaging one of the teeth of the outer-most ratchet 26 so that as the direction of movement of the carriage is reversed a further row of light images will be brought into register with the slit 23.

To now provide means serving to rotate the drums it will be seen that I may conveniently employ a pair of intermeshing gears 41 which are secured one to each of the shafts upon which the drums 34 are mounted, and these gears may in turn be driven by a shaft 42 upon which there is mounted a gear 43 meshing with a relatively small gear 44 affixed to one of the drum shafts. Any suitable mechanism may be employed for driving the shaft 42 as for example a crank 45 which is mounted upon the shaft at a point adjacent the casing 13 so as to render the rotation of the shaft convenient for an operator, and it will be seen that, as in Fig. 3 a further shaft 46 is provided which mounts a gear 47 meshing with one of the gears 41 aforementioned. Thus this shaft is also rotated upon the other shaft being moved, and this shaft serves to operate a suitable shutter 48 positioned preferably to the rear of the guide plate 22.

Finally it will be seen in Figs, 3 and 4 that the standards 16 also carry a supporting plate 49 upon which there may be mounted a source of illumination such as a bulb 50, and also the bracket 51 supporting the shutter 48, as well as a conventional condenser 52. Thus light rays will emanate from the bulb 50 and be interrupted by the shutter 48 at proper intervals subsequent to which these rays will pass through the condenser 52 which latter is in line with the slit 23 of the guide plate 22. Thus the rays will serve to project one of the pictures or exposures carried upon the film body 10, and this exposure will be accurately reproduced by a suitable receiving surface by the medium of a lens 53 which for the sake of convenience may be carried by the panel 14 of the casing 13.

From the foregoing it will be understood that all of the objects of this invention have been accomplished, incident to the fact that an extremely simple form of motion picture apparatus is provided which utilizes a novel form of film embracing numerous advantages, it being noted again, referring to the operation of the mechanism, that the film is mounted on the reel 24 and is threaded past the slit 23 of the guide plate 22, and after having its feed perforations 11 engaged by the feed sprockets 20, it is attached to the receiving reel 25. A rotation of the shaft 42 will now cause the drums 34 to be rotated, and this will in turn result in a step-by-step movement on the part of the carriage 18 sidewise, which movement will serve to bring successively, the images of a row presented by the film into register with the light rays so that a picture giving the illusion of motion may be thrown upon a suitable receiving surface. Upon the limit of movement of the carriage having been reached, the same will automatically reverse, and upon this occurring the film will be shifted by means of the pawl and ratchet mechanism to display the first picture in the next succeeding row, this entire operation being repeated indefinitely, and as long as the shaft 42 is rotated.

It will be understood that numerous modifications of structure might readily be resorted to without in the least departing from the scope of my claims which are as follows;

1. A motion picture apparatus including a carriage, a shaft supported by said carriage, film feeding means connected with said shaft, a standard, and pawl and ratchet mechanism associated with said standard and shaft, and means for bringing said mechanism into operative engagement to rotate said shaft.

2. A motion picture apparatus including a pair of spaced standards, a carriage, means for slidably mounting said carriage between said standards, a rotatable shaft supported by said carriage, film feeding means connected with said shaft, a pawl and ratchet mechanism connected with said shaft and standards, and means for shifting said carriage to bring said pawl and ratchet mechanism into operative engagement whereby to rotate said shaft.

3. A motion picture apparatus including a pair of spaced standards, a carriage, means for slidably mounting said carriage between said standards, a rotatable shaft supported by said carriage, film feeding means connected with said shaft, a pawl and ratchet mechanism associated with both of said standards and both ends of said shaft, and means for shifting said carriage between said standards whereby to operate said mechanism and to rotate said shaft.

4. A motion picture apparatus including a pair of standards spaced from each other, bars extending between said standards, a carriage slidably mounted upon said bars, a shaft rotatably supported by said carriage, film feeding mechanism connected with said shaft, a pawl and ratchet mechanism associated with said shaft and standards, and means for shifting said carriage along said bars whereby to operate said mechanism to effect a rotation of said shaft.

5. In a motion picture apparatus, the combination of a reciprocating carriage, a bar attached thereto, a traveler connected with said bar, a pair of rotatable drums formed with a spiral groove and arranged parallel to one another, said traveler co-operating with said grooves and a shiftable connection on the traveler and means for automatically shifting it from connection with one to connection with the other.

6. In a motion picture apparatus, the combination of a reciprocating carriage, a bar attached thereto, a traveler connected with said bar, a pair of rotatable drums formed with a spiral groove, and a shiftable pin carried by said traveler and extending into said groove said pin being mounted in the traveler and being adapted to be moved to bring its opposite ends respectively into connection with the said drums.

7. In a motion picture apparatus, the combination of a reciprocating carriage, a bar attached thereto, a traveler connected with said bar, a rotatable drum formed with a spiral groove, a pin slidably mounted on said traveler for projection into said groove, and means for moving said pin with respect to said traveler to project the pin into the groove or withdraw it therefrom and means engaging the pin for holding it in each of its extreme positions.

8. In a motion picture apparatus, film feeding means, a carriage upon which said means are mounted, said carriage being shiftable in a direction transversely of the film, a traveler connected with said carriage, a rotatable drum formed with a spiral groove, a pin slidable on the traveler for projection into or withdrawal from said groove and means engaging said pin for holding it in each of its extreme positions 9. In a motion picture apparatus, the combination of a reciprocating carriage, a bar attached thereto, a traveler connected with said bar, a rotatable drum formed with a spiral groove, a pin carried by said traveler and extending into said groove, said pin being shiftable on the traveler to project it into or withdraw it from the groove, and a cam surface forming a part of said groove for engaging said pin and moving the same with respect to said traveler.

10. In a motion picture apparatus, the combination of a reciprocating carriage, a bar attached thereto, a traveler connected with said bar, a rotatable drum formed with a spiral groove, a pin carried by said traveler and extending at one end into said groove, a cam surface forming a part of said groove for engaging said pin and moving the same with respect to said traveler, and a second rotatable drum positioned adjacent to said traveler and being formed with a groove engageable by the opposite end of said pin upon the latter being shifted.

11. In a motion picture apparatus, the combination of a reciprocating carriage, a bar attached thereto, a traveler connected with said bar, a rotatable drum formed with a spiral groove, a pin carried by said traveler and extending by one end into said groove, a cam surface forming a part of said groove for engaging said pin and moving the same with respect to said traveler, a second rotatable drum positioned adjacent to said traveler and parallel to said first-named drum and being formed with a groove engageable by the opposite end of said pin upon the latter being shifted, and a cam portion forming a part of the groove of said last named drum and being adapted to reshift said pin to cause the same to engage the groove of said first named drum.

12. In a motion picture apparatus, the combination with a film supporting carriage, of a pair of rotatable drums arranged parallel to one another and each provided with a carriage operating groove adapted to shift the carriage step by step, a traveler connected to the carriage and a reciprocating device adapted to be reciprocated in a line transverse to the axes of the drums and engaging in its extreme positions respectively with the grooves of said drums and means for automatically shifting the same at the end of the traverse of the carriage in either direction.

13. In a motion picture apparatus, the combination with a carriage supporting the film and the feed sprockets therefor, of a pair of drums arranged parallel to one another and each provided with a groove adapted to move the carriage step by step in a direction transverse to the film and a traveler connected to the carriage and provided with a shiftable pin adapted to be projected into the groove of either drum.

Signed at New York in the county of New York and State of New York this 20th day of September A. D. 1922.

HENRY LUBÉ.